United States Patent [19]

Taillie

[11] Patent Number: 5,132,715
[45] Date of Patent: Jul. 21, 1992

[54] CAMERA APPARATUS WITH PSEUDO-FORMAT FILM ENCODEMENT

[75] Inventor: Paul L. Taillie, Rochester, N.Y.

[73] Assignee: Eastman Kodak Company, Rochester, N.Y.

[21] Appl. No.: 708,964

[22] Filed: May 31, 1991

[51] Int. Cl.⁵ .............................................. G03B 17/24
[52] U.S. Cl. ................................................... 354/105
[58] Field of Search ................................ 354/105, 106

[56] References Cited

U.S. PATENT DOCUMENTS

| Re. 32,797 | 12/1988 | Harvey | 354/481 |
|---|---|---|---|
| 3,490,844 | 1/1970 | Sapp | 355/40 |
| 4,357,102 | 11/1982 | Taren et al. | 355/77 |
| 4,975,732 | 12/1990 | Robison et al. | 355/40 |

Primary Examiner—Michael L. Gellner
Attorney, Agent, or Firm—Francis H. Boos, Jr.

[57] ABSTRACT

Apparatus in a simple low cost camera for encoding predetermined formats of exposed image frames on film of the type having a magnetic layer thereon in which there are a plurality of parallel data tracks prerecorded on the film. A user-operable selector means on the camera is set to establish the format of an image frame to be exposed on the film. In response to the selector means, a magnetic means is translated laterally across the film to position a magnetic erasure field in the path of one or more of the prerecorded data tracks to cause erasure of a segment of the selected tracks associated with the image frame. Preferably, the erasure field is always in the path of a first of a plurality of tracks to simultaneously indicate both normal format and the extend of film usage. Movement of the erasure field into the path of one or more additional adjacent data tracks is used to indicate pseudo image formats such as pseudo-tele and pseudo-pan prints. The selected erased segments can then be detected at the photofinishing printer to cause printing of the appropriate normal or pseudo-format prints.

6 Claims, 6 Drawing Sheets

CAMERA APPARATUS WITH PSEUDO-FORMAT FILM ENCODEMENT

CROSS REFERENCE TO RELATED APPLICATIONS

This application discloses subject matter related to the disclosures of U.S. Pat. application Ser. No. 708,418, entitled "Camera Apparatus with Pseudo Format Film Encodement" filed concurrently herewith in the name of James Wesley Cannon and U.S. Pat. application Ser. No. 708,960, entitled "Camera Apparatus For Pseudo-Format Film Encodement" filed concurrently herewith in the name of Jeffrey Richard Stoneham.

FIELD OF INVENTION

This invention relates to the field of camera apparatus and more specifically to apparatus adapted to encode film to indicate the existence of normal, pseudo-tele-photo and pseudo-panoramic formats for specific image frames.

BACKGROUND OF INVENTION

A pseudo-telephoto print is one that is made from a central portion of a film image frame that has the same width-to-length ratio, e.g. 3.5:5, as that of the full sized frame. During the printing process, the peripheral margins of the film frame are masked and the central portion is enlarged to the desired size to give a print with an apparent telephoto or close-up format. The degree of telephoto effect is determined by the enlargement and masking employed at the printer.

A pseudo-panoramic print is one in which the upper and lower margins of the image frame are masked, i.e. eliminated from the print, to provide a viewing area with a width-to-length ratio greater than 1:2 and preferably 1:3. During the printing process, the film image frame is masked as described and the image is enlarged to provide a full height print with the appearance of a panoramic or elongated format. Both pseudo-tele and pseudo-pan prints are thus accomplished by adjustment of the printer without the need for the use of a true panoramic or telephoto lens in the camera.

The foregoing pseudo-formats and exemplary camera apparatus for implementing them are described more fully in commonly assigned U.S. Pat. 3,490,844—Sapp, and in U.S. Pat. 4,357,102—Taren et. al., respectively, the disclosures of which are incorporated herein by reference. Commonly assigned U.S. Pat. Re. 32,797—Harvey, describes apparatus for optically encoding the film with indicia at the appropriate frames to indicate the existence of a particular pseudo-format to enable automatic processing of the film in the printing process.

In commonly assigned U.S. Pat. 4,975,732—Robison et al, there is described photographic film technology embodying a layer of virtually transparent magnetic material coated on film on which information concerning film characteristics is recorded by the film manufacturer in a plurality of parallel tracks longitudinally disposed on the film. The information may be used by the camera to set picture-taking characteristics tailored to the specific film type in the camera. For this purpose, a magnetic read head would be embodied in the camera. Similarly, a magnetic read head would be included in the photofinishing printer to make use of such information during photofinishing processes to set certain operating characteristics of the printer.

As described in the '732 patent, such information is recorded as discrete, encoded data bits in a plurality of parallel data tracks. The tracks may contain real data concerning the film or, alternatively, dummy data bits may be recorded serially in certain of the tracks to establish the existence of the tracks. In a camera designed to make optimum use of the recorded film data a magnetic read head would be provided. Additionally, it would be expected that such a camera would be provided with the means, either via the same magnetic read head or a separate write head, to record data onto the film which could indicate the extent of film exposed in the camera as well as characteristics of the scene and of the camera settings involved in each exposure which are also useful in the photofinishing process. The disclosure of the '732 patent also contemplates that data recorded on the film by the camera magnetic head may include data indicating when pseudo-telephoto or pseudo-panoramic images are exposed in the camera at particular image frames. However, magnetic recording apparatus of the type capable of recording information in the form of discrete data bits is a relatively expensive feature that would tend to be limited to more costly cameras and consequently would not be suitable for use in low cost cameras. It is therefore desirable that some relatively inexpensive means be provided in low cost cameras that would take advantage of the recording capability of the magnetically coated film to provide an indication of when pseudo-telephoto and Pseudo-panoramic image frames exist on the film.

It is accordingly an object of the present invention to provide apparatus for indicating on film with a magnetic recording layer the existence of pseudo-format image frames on the film.

It is a further object of the invention to provide apparatus of the type described that is simple and inexpensive and thus suitable for use in low cost cameras.

It is a still further object of the invention to provide camera apparatus for recording a pseudo-format indication on film having a magnetic recording layer but that does not require the use of a relatively costly magnetic write head to write encoded data bits on the film.

It is yet another object of the invention to provide apparatus of the type described that is capable of indicating normal as well as pseudo-format image frames and simultaneously provide an indication of the extent of usage of the film in the camera.

SUMMARY OF INVENTION

In accordance with the invention, therefore, photographic camera apparatus is provided for encoding the existence of normal and pseudo-format image frame exposures on film of the type having a layer of magnetic recording material thereon in which prerecorded data exists in a plurality of adjacent parallel data tracks extending lengthwise along the film. The apparatus of the invention comprises selector means for establishing the existence of a particular format for an image frame exposed on the film and magnetic erasing means having a magnetic erasure field, the erasing means being responsive to the selector means for translating the erasure field over the magnetic recording material to selectively position the erasure field in the path of one or more of the prerecorded data tracks. When thus positioned, the erasure field causes erasure of each of the selected data tracks along a substantial segment thereof associated with an exposed image frame as the film is being advanced to an ensuing image frame position. By convention, the selected erased track segments represent the encodement which is indicative of the format of the image frame corresponding thereto. In a preferred form of the invention, the magnetic erasure field is always positioned in the path of a first or outermost track of a series of adjacent prerecorded tracks so as to simultaneously indicate by erasure of this first track both existence of a normal image format and the extent of usage of the film in the camera.

DETAILED DESCRIPTION

Figure 1:
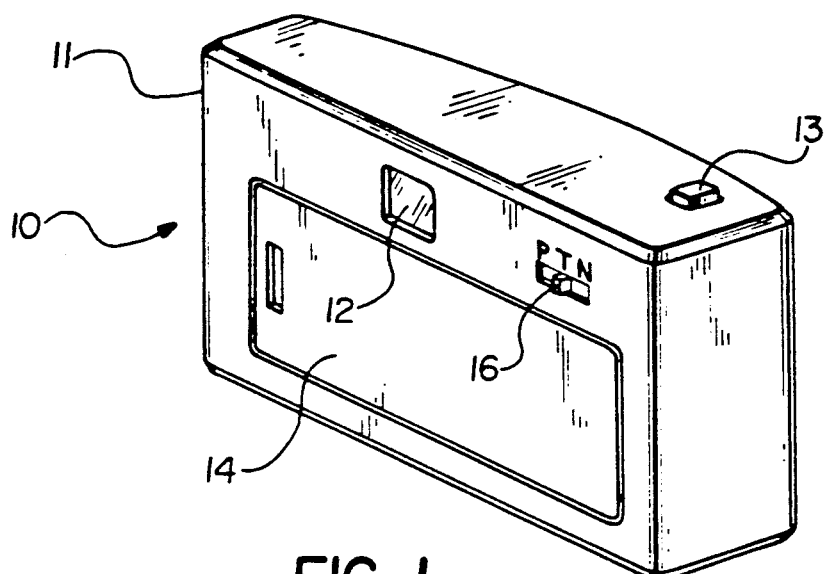
FIG. 1 is a perspective rear view of a camera illustrating a an image frame format selection button used in the apparatus of the invention.
Figure 2:
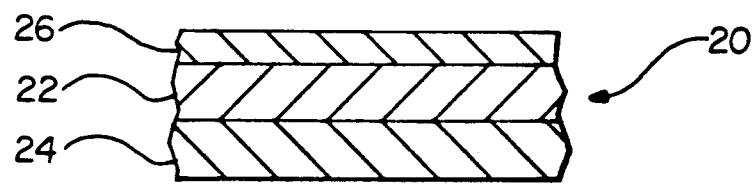
FIG. 2 is a schematic side cross sectional view of film having a magnetic recording layer with which the present invention is adapted to be used.

In FIG. 1, there is shown a camera 10 conventionally comprised of a body 11, viewfinder 12, shutter release button 13 and rear film access door 14. Camera 10 preferably is adapted to receive and utilize photographic film of the type schematically illustrated in FIG. 2 where there is shown a cross section of film 20 having a base layer 22 with a photographic emulsion layer 24 on one side and a layer of magnetic recording material 26 on the other side.

Figure 3:
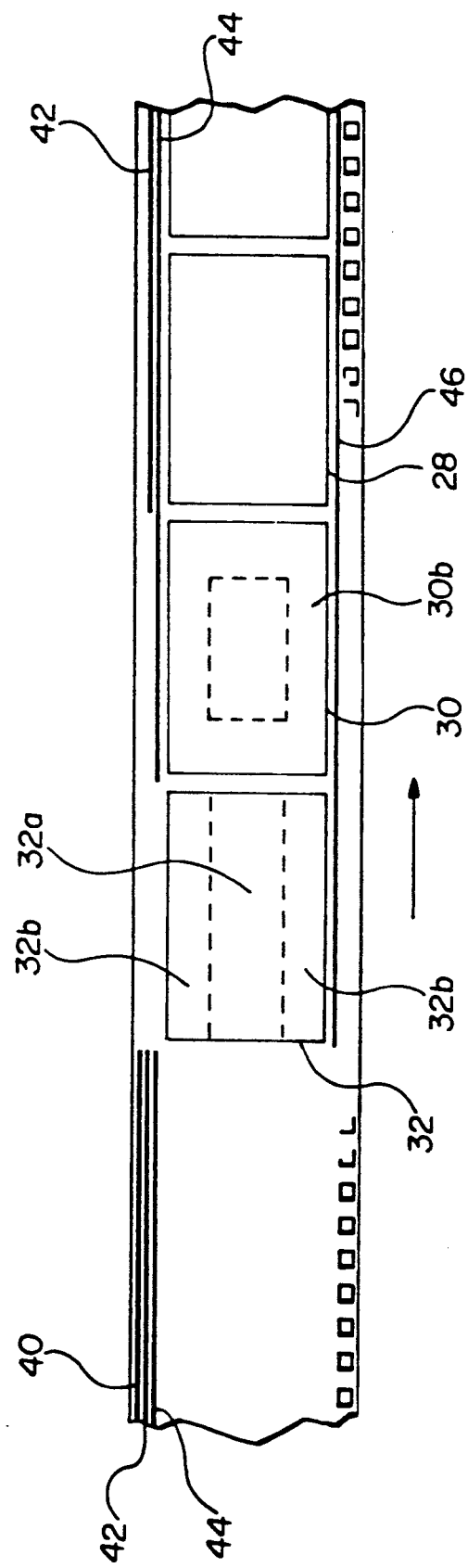
FIG. 3 is a diagrammatic illustration of a film strip illustrating various image frame formats.

Referring to FIG. 3, a plan view of film strip 20 is shown with exposed image frames at normal aspect ratio, e.g. 3.5:5, illustrated in solid lines and with the portions thereof to be used for making pseudo-format prints being shown in dotted outline. Thus, frame 28 represents a normal format image frame that will be reproduced at normal aspect ratio and without image magnification beyond that employed in making a normal print. Image frame 30 shows, in dotted outline, the central portion 30a of the image frame that will be magnified at the printer to create a pseudo-tele print with the same 3.5:5 aspect ratio but with, for example, a 2× normal magnification to give the appearance of a telephoto print. Typically, the surrounding image area 30b is masked off in the printing process. Correspondingly, in image frame 32 the central portion 32a bounded by the dotted outline illustrates a modified aspect ratio of the frame which will be employed at the printer in making a pseudo-pan print by masking the upper and lower portions 30b of the image frame and adjusting the magnification to make the short side of the resulting print substantially the same as the width of the print paper.

Recorded in the magnetic layer 26 of the film is a plurality of magnetic data tracks 40, 42 and 44. Data tracks 40-44 are preferably prerecorded by the film manufacturer to indicate certain film characteristics as previously described. An additional data track location 46 is shown between the image frame areas and the film drive/metering perforations 48 to illustrate the manner in which a type of camera having a built-in magnetic recording head would record picture taking characteristics for each frame, such as aperture size and shutter speed, flash or no flash, etc.. This track is shown for illustrative purposes only, since in a low cost camera for which the present invention is intended it is not likely that a magnetic recording head for this purpose would be included.

Referring again to FIG. 1, according to a particular feature of the invention, an image format slide selector button 16 is provided to enable the camera user to establish the existence of a particular format image on the film 20 by a type of magnetic encodement of the magnetic layer 26 on the film. As will be more apparent subsequently, the term "encodement" is used herein in a general sense to encompass selective erasure of elongated segments selected prerecorded data tracks as distinguished from the more restrictive sense of recording discrete data bits along a data track in a specific sequence determined by the information being represented thereby. In the illustrated embodiment of the invention, selector button 16 is shown as having three format settings: a right-hand position "N" corresponding to a normal, unmodified image format, a central position "T" corresponding to a pseudo-tele format and left-hand position, "P", corresponding to a pseudo-pan format.

Figure 4:
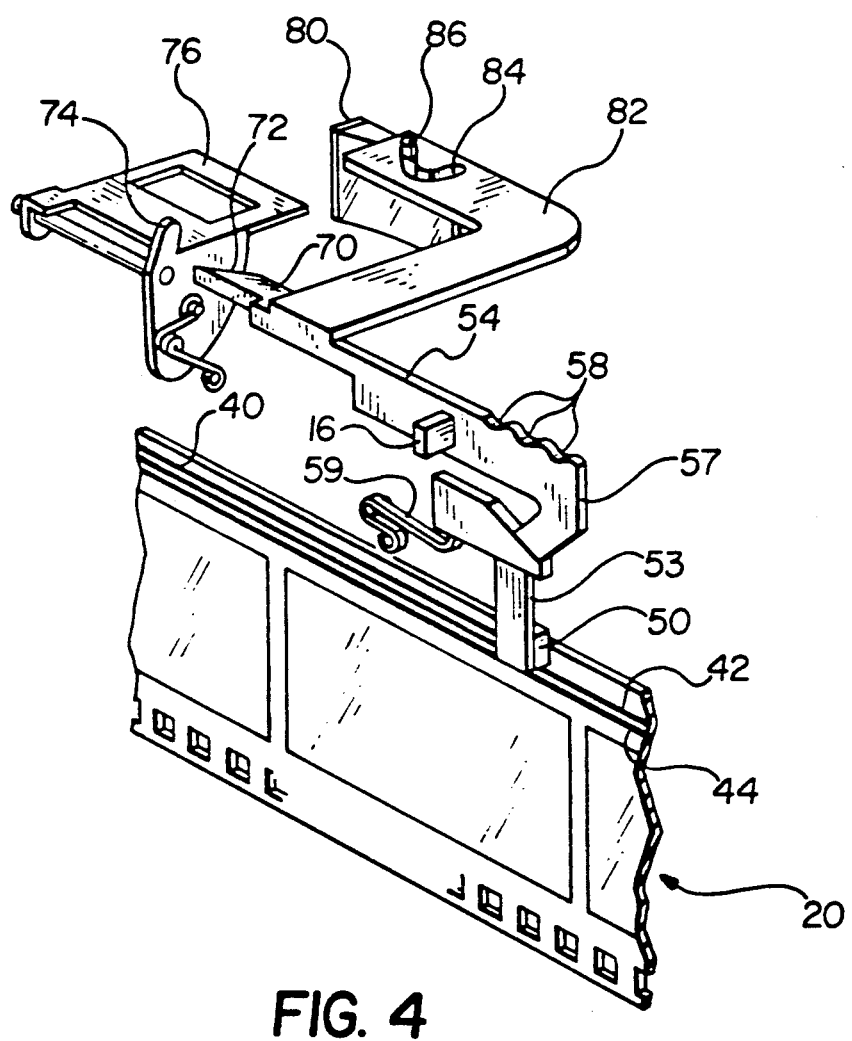
FIG. 4 is a diagrammatic perspective view of one preferred embodiment of camera apparatus constructed accordance with the present invention.
Figure 5:
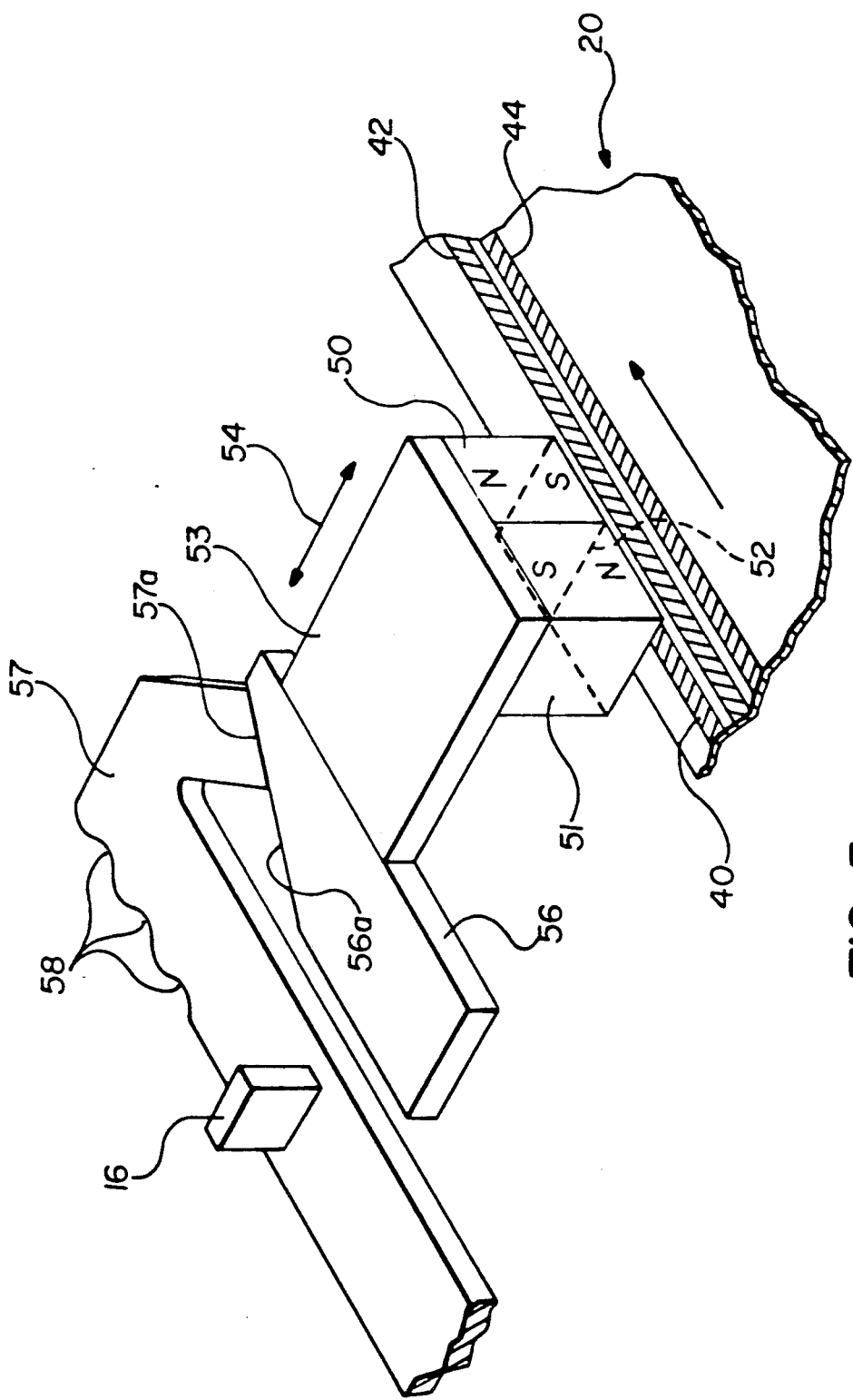
FIG. 5 is a perspective view of a portion of the apparatus of FIG. 4.
Figure 6:
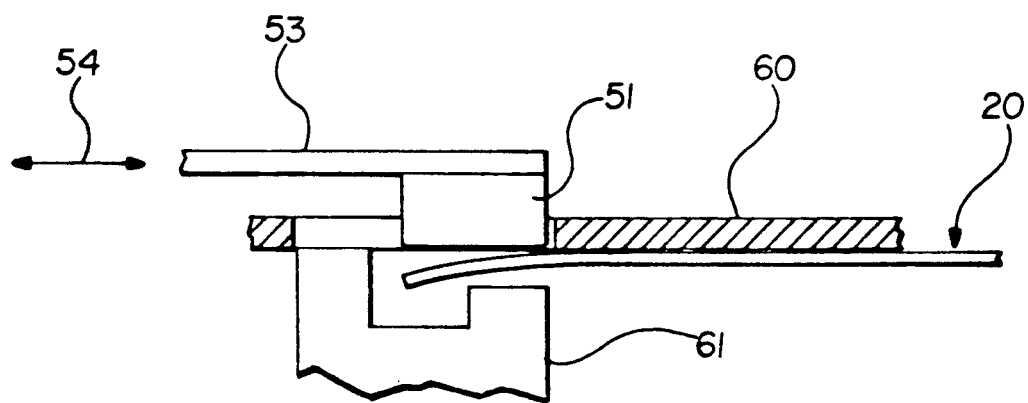
FIG. 6 is a partial cutaway side view of a portion of the apparatus of FIG. 5.

In the embodiment of the invention illustrated in FIGS. 4 through 6, the camera apparatus further includes magnetic erasing means comprising a pair of oppositely poled magnets 50,51 secured to a back plate 53 of high magnetic permeability material. With this arrangement, the magnetic flux lines external to the magnets are concentrated in the plate 53 above the magnets. Below the magnets the external flux lines are concentrated in the vicinity of juncture line 52 between the opposite poles of the magnets 50,51. It will be appreciated that separate magnets are not required since it is well known that a single block of magnet can be made with opposite regions as illustrated which will achieve the same external concentrated field effect.

Plate 53 is translatably mounted in a channel (not shown) within camera 10 so as to allow reciprocal movement of the magnets crosswise of the data tracks 40-44 as shown by double arrow 54 in a plane generally parallel to the plane of film 20. Plate 53 is secured to a cam plate 56 provided with a ramped surface 56a which engages a complementary ramped surface 57a formed on slide arm 57 to which selector button 16 is attached. A series of three indentations 58 may be formed on slide arm 57 to engage a detent (not shown) in the camera body to hold the arm in one of the three selected positions, N, T or P. A leaf spring 59 is included to provide a restoring force to return the magnets to a desired parked position when button is set in the Normal position. As seen in FIG. 6, the magnets are translatable laterally over the edge portion of film 20 within a slot formed in camera platen 60. It is not necessary that the magnets be in contact with the magnetic layer on the film in order for the erasure field from the magnets to extend into the paths of track 40-44. In an actually constructed embodiment, a magnetic field strength of 1300 gauss extending 0.6 mm below the magnets was sufficient to erase tracks recorded in a magnetic layer having a coercivity of 900 oersted. Thus, film gate 61 need only be designed to hold the film within a desired dimensional based on magnetic strength and magnetic layer coercivity which allows for a certain amount of the natural curl of the film to exist as it passes through the film gate. It also avoids the need for a pressure pad below the film to hold the magnetic layer against the magnets. An advantage of this arrangement is that the lack of magnet-to-film contact eliminates any induced resistance to movement of the film thereby minimizing the drive energy needed to advance or rewind the film in the camera. Also, it avoids any scratching of the film.

In FIG. 4, apparatus actuated by the movement of selector button 16 may be included within the viewfinder compartment of the camera to make it convenient for the user to visually frame the image scene for the appropriate pseudo-pan or pseudo-tele selection during the picture taking process. To this end, slide bar 54 is provided with an extension 70 which terminates in a ramped cam surface 72. When selector button 16 is moved to position "P", ramp 72 engages a follower tab 74 formed on a downwardly rotatable pseudo-pan viewing mask 76 to cause the mask to be rotated down into the field of view. A restoring spring 78 returns the mask to the upper position out of the field of view when selector button is moved to either of the "T" or "N" positions.

For pseudo-tele pictures, a lens 80 is axially translated within the viewfinder compartment to provided a zoom effect to the user while framing the image to be taken. Lens 80 is translated by means of L-shaped arm 82 attached at one end to slide bar extension arm 54. Arm 82 is provided at the distal end with a cam slot 84 which engages a follower pin 86 secured to the lens 80.

In operation, when it is desired to take normal (non-pseudo-format) pictures, the selector button is set by the user at the "N" position which positions the magnets 50,51 over prerecorded track 40. As the film is advanced through the film gate following each exposure, track 40 is erased by the external magnetic field underneath the junction between the two adjacent magnets. In this way, the erasure of the single track adjacent each exposed frame may be used to indicate the extent of usage of the film. When it is desired to take a pseudo-tele picture, selector button 16 is moved to the "T" position. The camming action of slide arm 57 against ramp 56a forces the magnets laterally over the film to position the magnets over both of tracks 40 and 42 thereby causing the segments of these tracks adjacent the pseudo-tele frame 30 to be erased during film advance after the picture is taken as shown in FIG. 3. In a similar manner, setting the selector button at the extreme "P" position moves the magnets 50,51 into position over all three tracks 40-44 causing erasure of the track segments adjacent the image frame during film advance thereby indicating the existence of a pseudo-pan image. When the film is delivered to the photofinisher, a printer provided with magnetic read heads to normally read data in the locations of tracks 40-44 would respond to the absence of any data in the segments of track 42 (for pseudo-tele) or both tracks 42 and 44 (for pseudo-pan) to adjust the frame mask and magnification as described previously to automatically print the appropriate pseudo-tele or pseudo-pan print.

Figure 7:
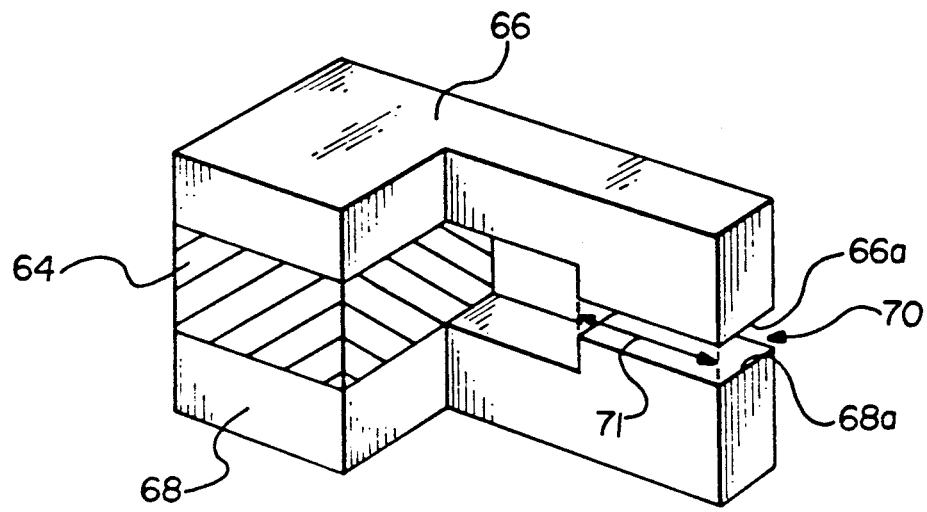
FIG. 7 is a perspective view of magnetic erasure means useful in an alternative preferred embodiment of the invention.
Figure 8:
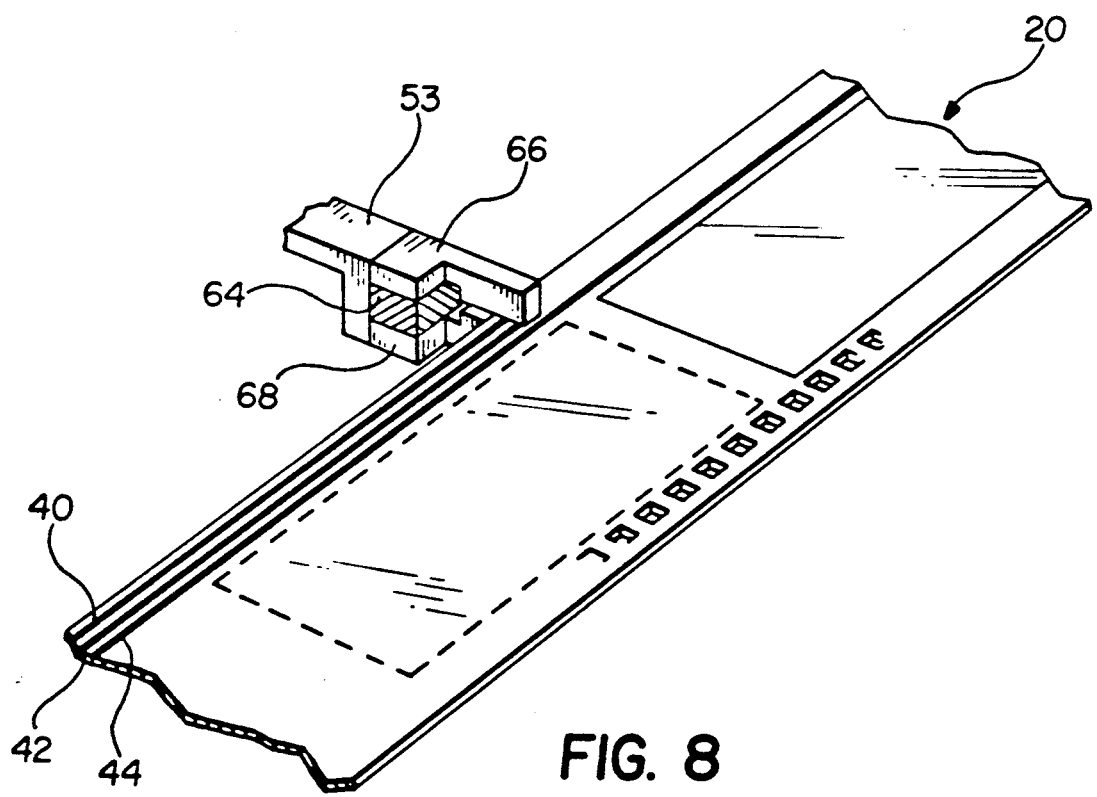
FIG. 8 is a perspective view similar to FIG. 4 but embodying the magnetic means of FIG. 7.

An alternative embodiment of the invention is illustrated in FIGS. 7 and 8 wherein the magnets 50,51 are replaced with C-shaped arrangement comprised of a magnet 64 and upper and lower pole pieces 66 and 68 forming an air gap 70 between poles 66a and 68a. With this arrangement, the edge portion of film 20 bearing the data tracks fits in the air gap allowing the magnetic means to translate over the film surface to cause the vertical magnetic field between the poles to selectively engage and erase one, two or three of the data tracks 40-44. This embodiment has an advantage over the previous embodiment in that a less costly single magnet is required to provide the necessary magnetic field between the poles to cause erasure of the selected tracks.

It is apparent, of course, that the elongated dimension 71 of the pole faces 66a and 68a extending laterally of the data tracks (and the corresponding dimension of magnets 50,51 in the previous embodiment) must be sufficiently long to span the total number of tracks used for image frame format encodement purposes. Where the erasure field is parked in the path of the first track for film usage indication purposes, the dimension must be sufficient to span the added tracks used for pseudo-format encodement. If film usage encodement is not employed, then, of course, the ability to span just the track or tracks used for pseudo-format encodement is required.

The invention has been described in detail with particular reference to a presently preferred embodiment, but it will be understood that variations and modifications can be effected within the spirit and scope of the invention.

What is claimed is:

1. Photographic camera apparatus for encoding the existence of normal and pseudo-format image frame exposures on film of the type having a layer of magnetic recording material thereon in which prerecorded data exists in a plurality of adjacent parallel data tracks extending lengthwise along the film, the apparatus comprising:

selector means for establishing the existence of a particular format for an image frame exposed on the film;

magnetic erasing means having a magnetic erasure field and responsive to the selector means for translating the erasure field over the magnetic recording material to selectively position the erasure field in the path of one or more of the prerecorded data tracks to cause erasure of each of the selected data tracks along a substantial segment thereof associated with an exposed image frame while the film is being advanced to an ensuing image frame position, the selected erased track segments being indicative of the format of the image frame corresponding thereto.

2. Camera apparatus according to claim 1 wherein said magnetic field is normally positioned over an outermost track of said plurality of adjacent data tracks so as to always erase said outermost track when said film is advanced after exposure of an image frame to thereby provide an indication of the extent of film usage for both normal and pseudo-format exposures.

3. Camera apparatus according to claim 1 wherein said erasure field is sufficiently wide in a direction perpendicular to the data tracks and generally parallel to the film plane to span all of the tracks dedicated to indicating format of the exposure frames.

4. Camera apparatus according to claim 1 wherein said magnetic means comprises a pair of opposed magnets positioned on one side of the film magnetic layer to provide a concentrated erasure field extending into said data tracks.

5. Camera apparatus according to claim 1 wherein said magnetic means comprises a magnet and a pair of magnetically coupled pole pieces provided with an air gap adapted to receive an edge portion of the film bearing said data tracks.

6. Camera apparatus according to claim 5 wherein said magnetic means is movable generally laterally of the lengthwise dimension of said film to selectively position the magnetic field formed in said air gap in the path of selected ones of said data tracks.

* * * * *